May 29, 1923.

W. J. HERSCHEDE ET AL 1,457,247

CENTERING CHUCK

Filed July 26, 1920

Patented May 29, 1923.

1,457,247

UNITED STATES PATENT OFFICE.

WALTER J. HERSCHEDE AND WALTER EBERHARDT, OF CINCINNATI, OHIO.

CENTERING CHUCK.

Application filed July 26, 1920. Serial No. 398,995.

*To all whom it may concern:*

Be it known that we, WALTER J. HERSCHEDE and WALTER EBERHARDT, citizens of the United States of America, and residents of Cincinnati, in the county of Hamilton and State of Ohio, have invented a new and useful Improvement in a Centering Chuck, of which the following is a specification.

Our invention relates primarily to chucks that are adapted to hold a plate, for example, a plate of glass, by means of air pressure and in which the plate must be accurately centered.

An object of our invention is to provide a chuck that will center a plate of glass and that will cooperate with or operate independently of any other means employed to retain the plate upon the chuck.

Another object is to provide a device that is positive in action and that is simple in construction and operation.

Another object is to provide a device that will accurately center an oval plate of glass.

These and other objects are attained by the means described herein and disclosed in the accompanying drawing in which.

Figure 1:
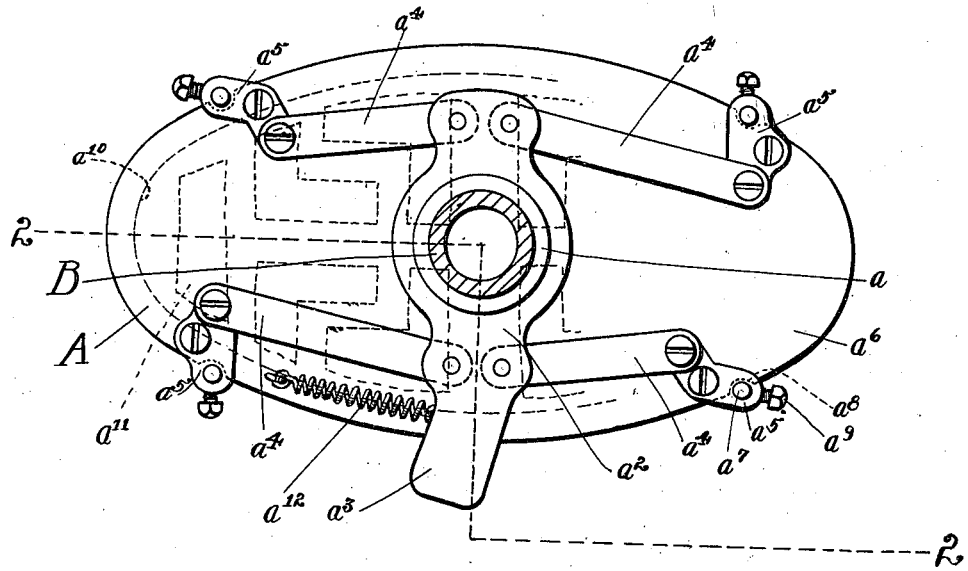
Fig. 1 is a sectional view on line 1—1 of Fig. 2.
Figure 2:
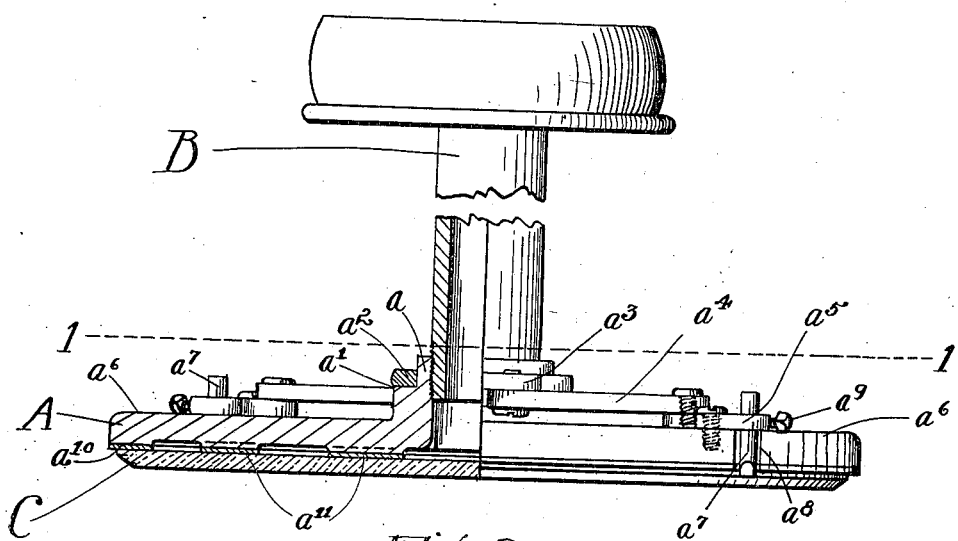
Fig. 2 is a sectional view on line 2—2 of Fig. 1.

Our invention comprises a chuck A mounted on a revoluble shaft B, the chuck having a series of fingers or pins $a^7$ adapted to center a plate C upon the chuck, said fingers being actuated simultaneously by the movement of the lever handle $a^3$.

The chuck A has a central flange $a$ that is adapted to be mounted upon the shaft B, such flange having a shoulder $a'$ upon which is rotatably mounted the collar $a^2$ having a handle $a^3$ developed upon it. Pivotally attached to the collar are the links $a^4$. The links are in turn pivotally attached to the lugs $a^5$ pivotally mounted upon the top of the hollow base $a^6$ of the chuck. The lugs have the pins $a^7$ extending therefrom, said pins projecting below the bottom of the base and seating in the notches $a^8$ formed in the periphery of the sides of the base. The distance to which the pins extend downwardly over the sides of the base may be adjusted by means of the set screws $a^9$ screwing into the lugs and engaging the pins. On the bottom of the base is a flat rim $a^{10}$ surrounding a series of plate supports $a^{11}$ extending thru the cavity in the base and having their bottom surfaces flush with the bottom of rim $a^{10}$. The spring $a^{12}$ engaging the base and the handle $a^3$ serves to hold the pins upon the plate C and return the parts to their normal positions.

The plate C is held upon the bottom of the base and is centered upon the base by means of the pins.

The operation of our device is as follows:

The chuck for any size of plate and having the collar $a^2$ mounted on the shoulder $a'$ formed on the flange $a$, is screwed on the threaded end of the hollow shaft B. The handle $a^3$ is then moved in a counter-clockwise direction thereby simultaneously disengaging all the pins $a^7$ from the notches or slots $a^8$ in which they are normally seated, and expanding the chuck.

A plate C is then held upon the rim $a^{10}$ and supports $a^{11}$, and the handle $a^3$ moved in a clockwise direction thereby causing the pins to engage the periphery of the plate and as the pins move toward their respective seats or notches $a^8$, they center the plate between them. The air between the plate and the chuck is then withdrawn thru the hollow shaft B, whereby atmospheric pressure secures the plate upon the chuck.

The supports $a^{11}$ prevent the breaking or cracking of the plate by giving a firm resistance to intermediate sections of the plate against the atmospheric pressure. The spring $a^{12}$ holds the pins upon the plate, thereby cooperating with the atmospheric pressure in retaining the plate upon the chuck.

What we claim is:

1. The combination with a chuck adapted to have work retained thereon by atmospheric pressure, of a work centering device comprising yielding means mounted on the chuck adapted to cooperate with the atmospheric pressure in retaining the work on the chuck.

2. The combination with a chuck having a hollow base over which work is placed, of a hollow shaft communicating with the cavity in the base, and a work centering device comprising yielding means mounted on the chuck adapted to frictionally retain the work over the cavity in the base.

3. The combination with a chuck having a hollow base over which work is placed, of a series of supports projecting thru the cavity and adapted to engage the work, and yielding means to center the work upon the chuck adapted to frictionally retain the work over the cavity in the base and in engagement upon the supports.

4. A chuck comprising a base, a flange on the base, a collar mounted on the flange, lugs pivotally mounted on the base and extending beyond the base, normally engaging the periphery of the base and adapted to engage the work, links connecting the collar and the lugs, and means to yieldingly maintain the lugs in their normal positions.

5. A chuck comprising a base, a flange on the base, a collar mounted on the flange, lugs pivotally mounted on the base, links connecting the collar and the lugs, adjustable pins extending from the lugs and adapted to normally engage the periphery of the base and to engage work mounted on the chuck, and a spring adapted to maintain the parts in their normal positions.

6. In a chuck the combination with a base of a series of lugs mounted on the base and normally engaging the periphery of the base, of means to simultaneously move the lugs to locking or releasing positions, said lugs being adapted to automatically center the work upon the chuck, and means to yieldingly maintain the parts in their normal positions.

7. The combination with a chuck having a hollow base over which work is placed, of a series of supports extending thru the cavity and adapted to engage the work, a hollow shaft supporting the chuck and having its bore communicating with the cavity in the base, a collar mounted on the chuck concentric with the shaft, lugs pivotally mounted on the chuck, links connecting the collar and the lugs, pins extending from the lugs and normally engaging and extending beyond the periphery of the chuck, and means to yieldingly retain the parts in their normal positions.

In witness whereof, we have hereunto subscribed our names this 21st day of July, 1920.

WALTER J. HERSCHEDE.
WALTER EBERHARDT.